UNITED STATES PATENT OFFICE.

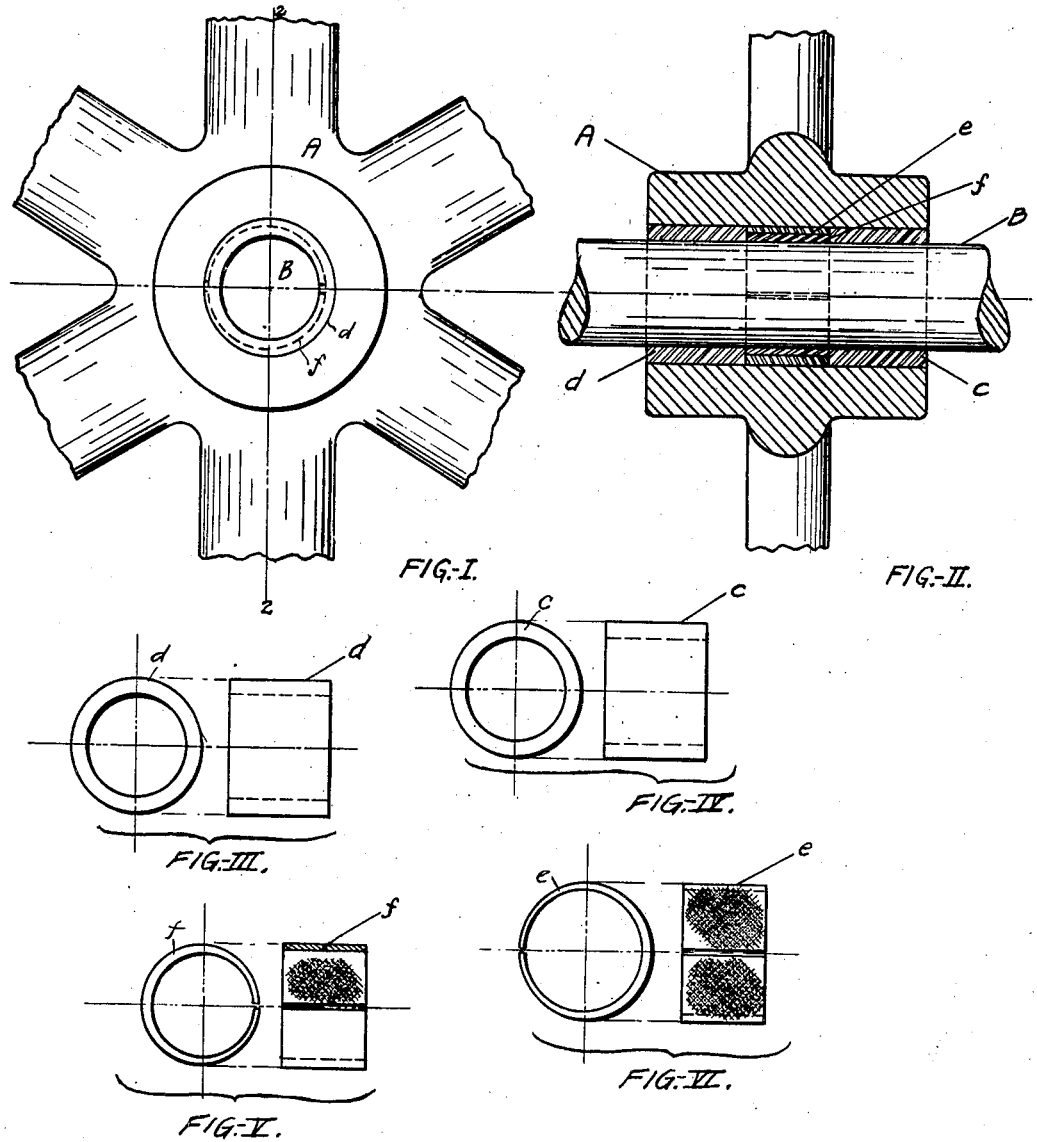

ARTHUR C. THORPE, OF STOCKTON, CALIFORNIA, ASSIGNOR OF ONE-HALF TO JAMES BUTLER, OF STOCKTON, CALIFORNIA.

FASTENING FOR PULLEYS.

1,087,265.  Specification of Letters Patent.  Patented Feb. 17, 1914.

Application filed August 12, 1912. Serial No. 714,684.

*To all whom it may concern:*

Be it known that I, ARTHUR C. THORPE, a citizen of the United States, residing at Stockton, in the county of San Joaquin and State of California, have invented certain new and useful Improvements in Fastenings for Pulleys, of which the following is a specification.

This invention relates to improvements in devices for fastening pulleys, gear wheels, etc., to shafts, and it is the object of the invention to provide a simple and efficient fastening of this kind which is devoid of projecting parts, and which does not require a keyway in the shaft or the hub of the pulley or other part to be fastened; thereby maintaining the full strength of the same.

In order that the invention may be better understood, reference is had to the accompanying drawing forming a part of this specification, in which drawing—

Figure 1 is an elevation showing the application of the invention. Fig. 2 is a vertical section on the line 2—2 of Fig. 1. Fig. 3 is an end view and elevation of one of the bushings. Fig. 4 shows similar views of the other bushing. Fig. 5 is an end view, and elevation, the latter being partly in section, of one of the eccentric bushings. Fig. 6 is an end view and elevation of the other eccentric bushing.

Referring specifically to the drawing, A denotes the hub of a pulley, gear wheel, or the like, which is to be made fast on the shaft B. The bore of the hub has a diameter which is greater than that of the shaft, so that the fastening devices may be applied.

Encircling the shaft, within the bore of the hub, are two eccentric bushings $e$ and $f$ which are made of case-hardened steel and split longitudinally at their thinnest portions. The two bushings are adapted to be placed one within the other, with their eccentricities opposite each other, the thinnest portion of one bushing being thus located opposite the thickest portion of the other bushing. The outer surface of the outer bushing $e$, and the inner surface of the inner bushing $f$, are knurled, as shown in Figs. 5 and 6. These two bushings are adapted to be positioned on that portion of the shaft which passes through the bore of the hub, they being located in the bore midway between the ends thereof, as shown in Fig. 2, and when assembled on the shaft, as stated, they form a perfect circular bushing and locate the pulley so that the shaft extends centrally through the bore of the hub. The bushing $e$ is so dimensioned that it has to be sprung inwardly when positioned within the bore of the hub, in view of which it will be held in frictional contact with the wall of the bore. The bushing $f$ is sprung on the shaft and is held thereon by frictional contact. The length of the bushings $e$ and $f$ is such that there is space on opposite sides thereof, within the bore of the hub, for bushings $c$ and $d$, respectively, said bushings encircling the shaft concentrically and fitting snugly in the bore of the hub. The outer ends of the bushings $c$ and $d$ are flush with the faces of the hub. The bushings $c$ and $d$ have the same inside and outside diameters as the bushing formed by the two eccentric bushings $e$ and $f$.

The fastening operates as follows: When the shaft starts to rotate, it carries the bushing $f$ with it owing to the frictional contact between said bushing and the shaft, this being increased by the knurled inner surface of the bushing. The bushing $e$ is held stationary in the bore of the hub by its frictional contact therewith which is also increased by the outer knurled surface of said bushing. The thickest portion of the bushing $f$ is therefore driven in the direction of the thickest portion of the bushing $e$. This action tends to wedge the bushings together, causing the hub to be firmly locked to the shaft. The bushings $c$ and $d$ center the shaft in the hub bore. A wedge action also takes place if the power is applied to the pulley instead of to the shaft, and this wedge action occurs irrespective of the direction in which the shaft or pulley are rotated.

The advantage of the herein described fastening will be evident from the foregoing description. No keys, feathers, set screws, etc., are needed, and the shaft and hub are not weakened by keyways. The motion may be transmitted in either direction. The fastening can be easily applied and is devoid of projecting parts to endanger the life of persons working close to the pulley. The device is especially useful for locking parts together in a small space, and also for parts of small diameter, which makes it desirable for use on automobiles, flying machines, motor cycles, etc.

I claim:

1. A device for fastening a hub to a shaft comprising eccentric bushings placed one within the other with their eccentricities opposite each other and encircling the shaft within the bore of the hub, the inner bushing being in frictional contact with the shaft, and the outer bushing in frictional contact with the wall of the hub bore, and concentric bushings in the hub bore on opposite sides of the eccentric bushings for centering the shaft therein.

2. A device for fastening a hub to a shaft comprising a resilient circular bushing fitting around the shaft, said bushing being eccentric and split at its thinnest portion, and a second resilient circular bushing encircling the first mentioned bushing, said second bushing being also eccentric and split at its thinnest portion, and having its outer surface in contact with the wall of the hub bore, and the eccentricities of said bushings being diametrically opposite each other.

3. A device for fastening a hub to a shaft comprising a resilient circular bushing fitting around the shaft and having a normal inside diameter which is smaller than the diameter of the shaft, said bushing being eccentric and split at its thinnest portion, and a second resilient circular bushing encircling the first mentioned bushing and having a normal outside diameter which is greater than the diameter of the hub bore, the outer surface of the second mentioned bushing being in contact with the wall of the hub bore, and said bushing being also eccentric and split at its thinnest portion, the eccentricities of said bushings being diametrically opposite each other.

In testimony whereof I affix my signature in presence of two witnesses.

ARTHUR C. THORPE.

Witnesses:
 ERNEST ARATA,
 FRANK LAKE.